United States Patent [19]

Kawamura

[11] Patent Number: 4,480,902

[45] Date of Patent: Nov. 6, 1984

[54] CAMERA HAVING LIGHT MEASURING MODE CHANGE-OVER DEVICE WITH SAFETY CIRCUIT

[75] Inventor: Masaharu Kawamura, Kanagawa, Japan

[73] Assignee: Canon Kabushiki Kaisha, Tokyo, Japan

[21] Appl. No.: 441,091

[22] Filed: Nov. 12, 1982

[30] Foreign Application Priority Data

Nov. 13, 1981 [JP] Japan .............................. 56-182642

[51] Int. Cl.³ .......................................... G03B 7/093
[52] U.S. Cl. .................................... 354/434; 354/458
[58] Field of Search ..................... 354/230, 31, 50, 51, 354/60 R, 60 A, 289, 429, 431–434, 458, 481

[56] References Cited

U.S. PATENT DOCUMENTS 4,106,033 8/1978 Nakamoto et al. ............... 354/23 D

Primary Examiner—William B. Perkey
Attorney, Agent, or Firm—Toren, McGeady and Stanger

[57] ABSTRACT

In a camera which permits the photographer to change one light measuring mode to another as desired according to the condition of the object to be photographed, when a shutter release action initiating operation and a light measuring mode change-over operation are concurrently performed, an inadequate exposure results from a certain length of time required for charging a storage capacitor if the camera is of the type which stores light measurement information through an analog storing process or for AD conversion if the camera is of the digital storing type; or an inadequate exposure results from a control action on the shutter if the camera is of the type requiring no process for storing the information such as a camera of the type measuring a light reflected by the film surface. This problem is solved by a safety device which inhibits a light measuring mode change-over action at least until completion of a process of storing light measurement information after a shutter release action is initiated in the case of the light measurement information storing type or inhibits the change-over action during a shutter control action if the camera is of the type which measures the light reflected by the film surface, etc. in a mode called the TTL direct metering mode without requiring any process of storing light measurement information.

8 Claims, 3 Drawing Figures

CAMERA HAVING LIGHT MEASURING MODE CHANGE-OVER DEVICE WITH SAFETY CIRCUIT

BACKGROUND OF THE INVENTION

1. Field of the Invention

This invention relates to a safety device for a camera and, more particularly, to a safety device for a camera of the type permits a change-over from one light measuring mode to another.

2. Description of the Prior Art

The conventionally known light measuring modes in cameras which automatically perform exposure control include a mode called the averaged overall light measuring type which measures a light by averaging the entire light within the visual field of a view finder; a mode called the center-weighted light measuring type which sets importance on the central portion of the visual field and measures the peripheral portion to a lesser degree; and another mode called the partial light measures type measuring only the central portion. These different light measuring modes respectively have merits and demerits in accordance with the conditions of objects to be photographed. Adoption of the averaged overall light measuring mode is normally preferable for a front-lighted shot. The center-weighted light measuring mode is normally preferable in cases where the object is under a bright sky. The partial light measuring mode is normally preferable for a backlight shot. With the camera arranged to permit a change-over from one light measuring mode to another, as desired, when the photographer performs a shutter release initiating operation and a light measuring mode change-over operation concurrently with each other, there arises the following inconvenience: In shifting the light measuring mode using a camera of a light measurement information storing type, some length of time is necessary either for changing a storage capacitor, in the case of an analog storing arrangement, or, for AD conversion, in the case of a digital storing arrangement. This length of time results in an improper exposure. Further, where the camera is of the type which does not require any process of storing light measurement information such as the TTL direct metering type arranged to measure the light through a light reflected from the film surface, a shutter control action will hinder photographing with an adequate exposure.

SUMMARY OF THE INVENTION

It is, accordingly, an object of the present invention to provide an improved camera which eliminates the disadvantages of prior art cameras.

It is another object of the invention to provide a safety device for a camera which is arranged to inhibit a light measuring mode change-over action at least before completion of a process of storing light measurement information after commencement of a shutter release action, if the camera is of the type requiring a process of storing the light measuring information, and to inhibit the light measuring mode change-over action from being performed during a shutter control action in the case where the camera is of the type measuring a light reflected from the film surface without requiring any process of storing light measurement information.

These and further objects and features of the invention will become apparent from the following detailed description of embodiments thereof taken in connection with the accompanying drawings.

DESCRIPTION OF THE PREFERRED EMBODIMENT

Figure 1:
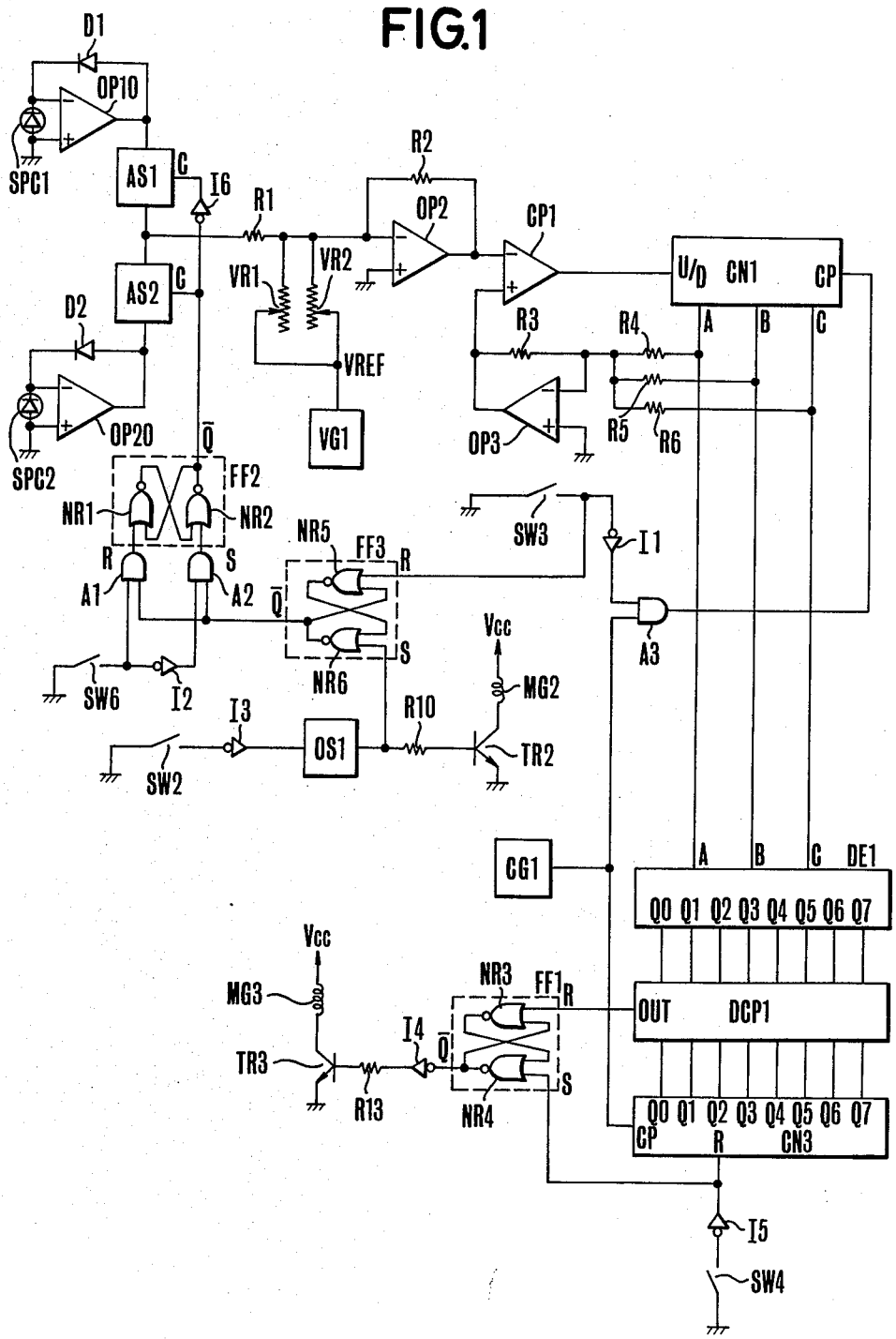
FIG. 1 is a circuit diagram showing a camera as an embodiment of the present invention.

An example of a camera embodying the present invention is shown in the circuit diagram of FIG. 1. In the embodiment, a light sensitive element SPC1, which is arranged for partial or spot light measurements, is connected between the input terminals of an operational amplifier OP10 (hereinafter will be called the OP amp. for short) which is of a high impedance input type. A diode D1 is connected to the feedback path of the OP amp. OP10 for logarithmic suppression. The light sensitive element SPC1, the OP amp. OP10 and the diode D1 compose a light measuring circuit for partial or spot light measurement. This light measuring circuit produces an output which is obtained by logarithmically suppressing a brightness measured by the spot light measurement. A light sensitive element SPC2 which is provided for averaged overall light measurement is connected between the input terminals of an OP amp. OP20. The OP amp. OP20 has a diode D2 connected to the feedback path thereof for logarithmic suppression. The light sensitive element SPC2, the OP amp. OP20 and the diode D2 compose a light measuring circuit for averaged overall light measurement (to be employed for normal pbotographing). A brightness measured by averaged overall light measurement is logarithmically suppressed and is produced as the output of the light measuring circuit.

The embodiment includes analog switches AS1 and AS2 which are arranged to be rendered conductive with a high level signal (hereinafter will be called an H level signal) impressed on the control terminal C of each of them. With these switches rendered conductive, the output of the light measuring circuit is transmitted to an OP amp. OP2 which will be described later herein. An inverter I6 is connected between the control terminals of the analog switches AS1 and AS2. This inverter I6 is arranged to have the output of a flip-flop circuit FF2 which consists of NOR circuits NR1 and NR2 impressed on the input terminal thereof. Meanwhile, AND circuits A1 and A2 are respectively connected to the input terminal of the flip-flop circuit FF2. The output of another flip-flop circuit FF3 which consists of NOR circuits NR5 and NR6 is impressed on one of the input terminals of each of the AND circuits A1 and A2. Meanwhile, a switch SW6 is connected directly to the other input terminal of the AND circuit A1 and also to the other input terminal of the AND circuit A2 through an inverter I2. This switch SW6 is interlocked with a light measuring mode change-over operation member which is not shown. When a partial (or spot) light measuring mode is selected through this operation member, this switch SW6 is turned on. The switch SW6 turns off when an averaged overall light measuring mode is selected.

Since the gates of the AND circuits A1 and A2 are open when the output of the NOR circuit NR6 is at an H level, the information of the light measuring mode change-over switch SW6 directly controls the flip-flop circuit FF2. When the averaged overall light measuring mode is selected, the analog switch AS2 is selected and closed because the switch SW6 is off. When the partial light measuring mode is selected, the switch SW6 is turned on and the analog switch AS1 is selected and closed through the inverter I6.

A variable resistor VR1 is interlocked with a film sensitivity setting dial which is not shown. The movable contact piece of the variable resistor VR1 is connected to a constant voltage source VG1 which supplies a constant voltage VREF. Another variable resistor VR2 is arranged to operate in response to the movement of an aperture presetting ring which is not shown. The above stated constant voltage VREF is also supplied to the movable contact piece of the variable resistor VR2. These variable resistors VR1 and VR2 compose a preset information setting circuit and are arranged to supply currents corresponding to film sensitivity information SV and aperture information AV respectively.

An exposure computing OP amp. OP2 has a resistor R2 connected to the feedback path thereof. Meanwhile, the above stated variable resistors VR1 and VR2 are connected to the negative input terminal of the OP amp. OP2. The output terminals of the analog switches AS1 and AS2 are also connected to the OP amp. through the resistor R1. The OP amplifier OP2 performs a computation of $BV+SV-AV=TV$ based on the above stated preset information SV and AV and brightness information BV which is received from the light measuring circuit through the analog switch. Then, a voltage which is inversely proportional to an APEX value TV of shutter time is produced from the OP amp. OP2.

The output terminal of the OP amp. OP2 is connected to the negative input terminal of a comparator CP1 while the positive input terminal of the comparator CP1 is connected to another OP amp. OP3 which will be described later herein. An up-down counter CN1 has the output terminal of the comparator CP1 connected to the up-down terminal U/D. A clock pulse generator CG1 is connected to the clock terminal CP of the up-down counter CN1 through an AND gate A3. The up-down counter CN1 up-counts when the output of the comparator CP1 is at an H level and down-counts when the output of the comparator CP1 is at a low level (hereinafter will be called an L level). The output terminals A–C of the up-down counter CN1 have ladder resistors R4, R5 and R6 connected thereto. These ladder resistors have resistance values of a multiple progression. An inversion amplifier is composed of an OP amp. OP3 which has a resistor R3 connected to the feedback path thereof. The comparator CP1, the counter CN1, the ladder resistors R4–R6 and the OP amp. OP3 compose a follow-up comparison type A–D converter which converts the output of the OP amp. OP2 into a digital value in the following manner:

At the initial stage thereof, the count value of the counter CN1 is zero. Therefore, the output of the OP amp. OP3 is at a high level. The comparator CP1 produces a high level output and the counter CN1 is in an up-counting state. Accordingly, the counter CN1 performs an up-count and the output of the OP amp. OP3 gradually lowers according as the count value of the counter increases. When the output of the OP amp. OP3 exceeds the output of the OP amp. OP2, the output of the comparator CP1 becomes an L level to bring the counter CN1 into a down-counting state. If there occurs no change in the brightness after the counter begins the down-counting state, the counter CN1 repeats up-count and down-count at every pulse. Then, a digital value of the shutter time based on the light measurement output obtained in the selected light measuring mode is formed at the counter CN1.

There is provided a storage switch SW3 which is arranged to turn off in response to a shutter release operation immediately before a mirror is uplifted. This switch SW3 is connected through an inverter I1 to one of the input terminals of the AND gate A3 and inhibits pulses from entering the counter immediately before the mirror is uplifted. Further, the storage switch SW3 is connected to the reset terminal R of the above stated flip-flop circuit FF3.

Another switch SW2 which is arranged to close in response to a release operation is connected through an inverter I3 to a one shot circuit OS1. When the switch SW2 is turned on, the output of the circuit OS1 becomes an H level after the lapse of a given length of time. This output or a signal turns a transistor TR2 on through a resistor R10. With the transistor TR2 turned on, a releasing combination magnet MG2 has a power supply thereto for a given length of time. Then, the camera is released from a first clamping state to allow the leading curtain of the shutter to travel. At that time, the storage switch SW3 is on; the flip-flop FF3 is set by the H level signal from the circuit OS1; and the gates of the AND circuits A1 and A2 are closed by the Q output of the flip-flop FF3. Therefore, the information of the above stated light measuring mode change-over switch SW6 is not transmitted to the flip-flop circuit FF2.

A 3 line–8 line decoder DE1 is connected to the output terminals A–C and the input terminals A–C of the above mentioned counter CN1. In accordance with input information, an H level signal is produced from one of the output terminals Q0–Q7 of the decoder. A count switch SW4 is arranged to turn off when the leading shutter curtain travels. A reference symbol CN3 indicates a counter for counting shutter time. The counter CN3 is arranged to begin counting when the switch SW4 turns off. A digital comparator DCP1 compares the content of the decoder DE1 with that of the counter CN3 and produces an H level signal from its output terminal OUT when the outputs of the decoder and the counter coincide with each other. The decoder DE1, the counter CN3 and the digital comparator DCP1 jointly compose a timer circuit for counting shutter time.

There is provided an RS flip-flop FF1 which consists of NAND circuits NR3 and NR4. The set terminal S of the flip-flop FF1 is connected to the above stated inverter I5 and the reset terminal R thereof to the output terminal OUT of the above stated digital comparator DCP1. The $\bar{Q}$ output terminal of the flip-flop FF1 has an inverter I4 connected thereto. This inverter I4 is connected through a resistor R13 to the base of a transistor TR3. A trailing shutter curtain holding magnet MG3 is connected to the collector of the transistor TR3. A trailing shutter curtain control circuit is formed by the flip-flop FF1, the inverter I4, the transistor TR3 and the magnet MG3.

Figure 2:
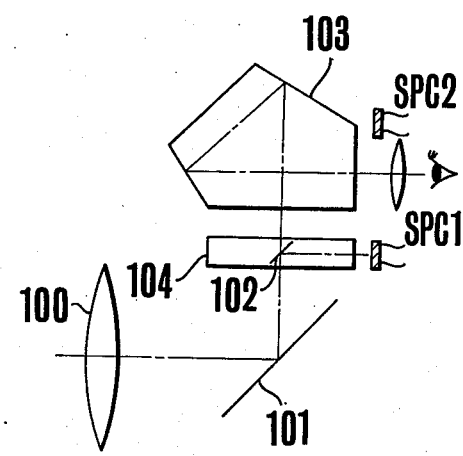
FIG. 2 is a schematic illustration in which the arrangement of light sensitive elements shown in FIG. 1 is shown in relation to a view finder optical system.

The light sensitive elements SPC1 and SPC2, shown in FIG. 1, are arranged in relation to the optical system of the view finder of the camera as shown in FIG. 2. Referring to FIG. 2, the camera includes a photo-taking lens 100, a reflection mirror 101 and a reticle 104 which is provided with a half mirror 102. The half mirror 102 guides only the middle part of the light flux of a picture to be taken to the light sensitive element SPC1. The partial (or spot) light measurement is thus performed by the light sensitive element SPC1. The above stated light sensitive element SPC2 is arranged in combination with a penta-prism 103 to perform the averaged overall light measurement by receiving the whole light quantity of the reticle 104.

The operation of the camera according to the invention, that is, the light measuring mode change-over inhibiting action which is performed during a shutter release action is as described below with reference to FIGS. 1 and 2. At the time of ordinary photographing with averaged overall light measurement, the light measuring mode change-over switch SW6 is off. Let us assume that, at the initial stage before a shutter release operation, the flip-flop FF3 is reset and is producing an H level signal.

Therefore, the flip-flop FF2 is reset through the AND circuit A1. The flip-flop FF2 produces an H level signal to render the analog switch AS2 conductive and the analog switch AS1 nonconductive and light measurement output based on the output of the light sensitive element for averaged overall light measurement is constantly supplied to the OP amp. OP2. In the case where photographing is to be carried out by suddenly changing this condition to the partial light measuring mode, that is, when the switch SW6 is switched immediately after a shutter release operation, the embodiment operates in the following manner: The switch SW2 turns on in response to the release operation. The flip-flop FF3 produces an L level signal to close the gates of the AND circuits A1 and A2.

Accordingly, the signal of the light measuring mode change-over switch SW6 is inhibited from being supplied to the flip-flop FF2. The flip-flop FF3 produces an H level signal in synchronism with the storage switch SW3 which turns off immediately before mirror-uplifting and aperture-stopping-down actions. In other words, the gates of the AND circuits A1 and A2 are closed and the light measuring mode change-over action is inhibited during the period from the commencement of the shutter release action to the completion of a process of storing the photographic information.

Figure 3:
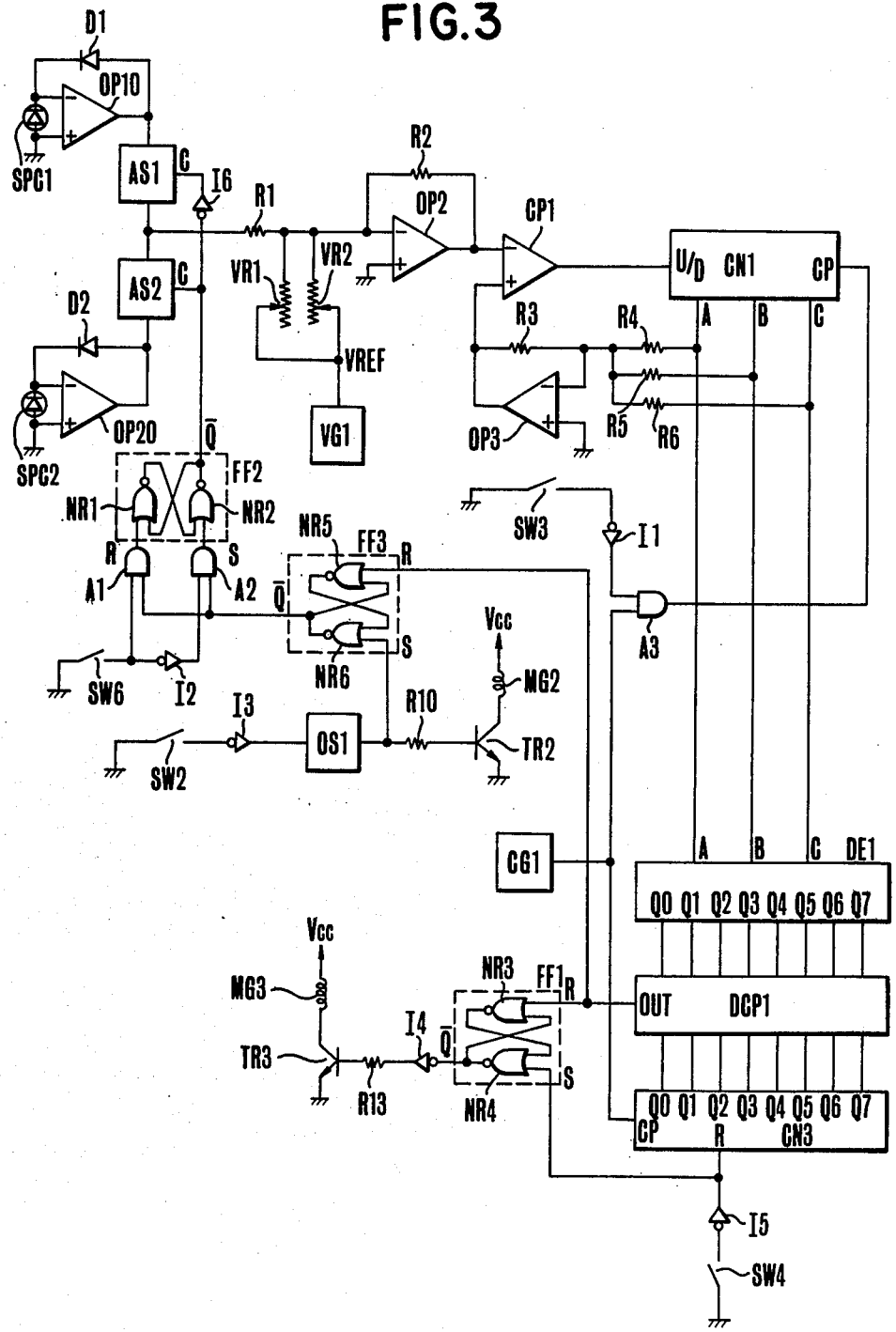
FIG. 3 is a circuit diagram showing a second embodiment of the present invention.

Further, termination of the above stated inhibiting action does not have to be synchronized with the storage switch SW3 but may be arranged to be synchronized with completion of shutter control. In the latter case, the input to the NOR circuit NR5 may be connected to the output terminal OUT of the digital comparator DCP1 instead of the switch SW3 to obtain the same inhibiting effect as shown in FIG. 3.

The the same inhibiting effect is attained through the same process as the above-mentioned process when the switch SW6 is shifted from the partial light measuring mode to the averaged overall light measuring mode.

Further, with a shutter button depressed by the shutter releasing operation, the aperture of a diaphragm member which is not shown is stopped down and the leading shutter curtain begins to travel. The travel of the leading shutter curtain causes the switch SW4 to turn off. The counter CN3 is released from its reset state to begin its counting action. The count value of the counter CN3 is compared with a decode signal of the decoder DE1 obtained from the digital value of the above stated counter CN1. When the two values come to coincide with each other, i.e. when the shutter time value stored by the counter CN1 comes to agree with the count value of the counter CN3, the output terminal OUT of the comparator produces an H level signal. This H level signal is supplied to the reset terminal R of the flip-flop FF1. This causes the $\overline{Q}$ output of the flip-flop FF1 to become an H level. Then, through the inverter I4, an L level signal is impressed on the base of the transistor TR3 to turn off the transistor TR3. With the transistor TR3 turned off, the power supply to the magnet is cut off to allow the trailing shutter curtain to travel to terminate an exposure.

In accordance with the present invention as described in the foregoing, the light measuring mode change-over action is inhibited during a shutter release action even when the light measuring mode is changed to actuate the switch at the time of a shutter release action. The invention thus ensures an appropriate exposure with the provision of the inhibiting arrangement.

What I claim is:

1. A camera comprising:
    a light measuring circuit having a plurality of light measuring modes, with different light measuring sensitivity distributions, wherein one of said plurality of modes is selectively used in accordance with the condition of an object to be photographed;
    an exposure control circuit for controlling an exposure on the basis of an output of the light measuring circuit;
    mode selecting means for selectively changing the light measuring mode; and
    means for preventing the change-over of the light measuring mode by said mode selecting means in response to a shutter release operation in order to prevent an improper exposure.

2. A camera according to claim 1, wherein said light measuring circuit has light receiving portions adapted to said respective light measuring modes.

3. A camera according to claim 2, wherein said mode selecting means change-over the light receiving portions of the light measuring circuit.

4. A camera according to claim 1, wherein said exposure control circuit controls the exposure in accordance with a memorized output which was previously measured by said light measuring circuit.

5. A camera according to claim 1, wherein said preventing means are adapted to prevent the change-over of the light measuring mode at least during shutter action controls.

6. A camera according to claim 1, wherein said plurality light measuring modes include at least two types of modes, that is, an averaged overall measuring mode and a partial light measuring mode.

7. A camera comprising:
    a light measuring circuit having a plurality of light measuring modes with different light measuring sensitivity distributions, wherein one of said plurality of modes is selectively used in accordance with the condition of an object to be photographed;
    memory means for measuring an output of the light measuring circuit in response to a shutter release operation;
    an exposure control circuit for controlling an exposure on the basis of an output of the memory means;
    mode selecting means for selectively changing the light measuring mode in a manual manner; and
    preventing means being adapted to prevent the change-over of the light measuring mode at least from the start of the memorizing operation of photographing information by said memory means until completion of said memorizing operation.

8. A camera comprising:

a light measuring circuit having a plurality of light measuring modes with different light measuring sensitivity distributions, wherein one of said plurality of modes is selectively used in accordance with the condition of an object to be photographed;

an exposure control circuit for controlling an exposure on the basis of an output of the light measuring circuit;

mode selecting means for selectively changing the light measuring mode in a manual manner; and prevention means adapted to prevent the changeover of the light measuring mode for a predetermined period of time at least from the start of a shutter action according to a camera release operation to completion thereof when the camera is in an operative state, in order to prevent an improper exposure.

* * * * *